(12) United States Patent  
Kuwabara et al.

(10) Patent No.: US 10,871,892 B2  
(45) Date of Patent: Dec. 22, 2020

(54) INPUT DEVICE

(71) Applicant: KYOCERA Corporation, Kyoto (JP)

(72) Inventors: Megumi Kuwabara, Kanagawa (JP); Junichi Ujii, Kanagawa (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 16/455,003

(22) Filed: Jun. 27, 2019

(65) Prior Publication Data

US 2019/0317653 A1    Oct. 17, 2019

Related U.S. Application Data

(63) Continuation of application No. 15/155,426, filed on May 16, 2016, now abandoned, which is a continuation of application No. 13/146,814, filed as application No. PCT/JP2010/000459 on Jan. 27, 2010, now Pat. No. 9,436,344.

(30) Foreign Application Priority Data

Jan. 28, 2009    (JP) ................................. 2009-017322

(51) Int. Cl.
*G06F 3/0488* (2013.01)
*G06F 3/048* (2013.01)

(52) U.S. Cl.
CPC ............ *G06F 3/0488* (2013.01); *G06F 3/048* (2013.01); *G06F 2203/04105* (2013.01)

(58) Field of Classification Search
CPC ................... G06F 3/0488; G06F 3/048; G06F 2203/04105
See application file for complete search history.

(56) References Cited

U.S. PATENT DOCUMENTS

| 5,065,347 | A  | 11/1991 | Pajak et al. |
| 5,680,562 | A  | 10/1997 | Conrad et al. |
| 5,793,360 | A  | 8/1998  | Fleck et al. |
| 5,917,492 | A  | 6/1999  | Bereiter et al. |
| 6,940,494 | B2 | 9/2005  | Hoshino et al. |
| 7,610,564 | B1 | 10/2009 | Pfohe et al. |

(Continued)

FOREIGN PATENT DOCUMENTS

| JP | 8511637 A  | 12/1996 |
| JP | 09-6519 A  | 1/1997  |

(Continued)

OTHER PUBLICATIONS

Microsoft Corp., "How to Close a Folder and All Its Parent Folders". Microsoft Support, Jan. 19, 2007, United States URL: http://support.microsoft.com/kb/141210/EN-US.

(Continued)

*Primary Examiner* — Grant Sitta
(74) *Attorney, Agent, or Firm* — Studebaker & Brackett PC

(57) ABSTRACT

An input device is disclosed. An input device comprises a display unit, an input unit, a load detection unit and a control unit. The display unit is configured to display an object of a folder with a hierarchical structure. The load detection unit is configured to detect a pressing load with respect to the input unit corresponding to the location of the object of the folder that is displayed on the display unit. The control unit opens and closes folders based on a change in the pressing load.

4 Claims, 16 Drawing Sheets

(56) References Cited

U.S. PATENT DOCUMENTS

| | | | | |
|---|---|---|---|---|
| 7,818,691 | B2* | 10/2010 | Irvine | G06F 3/04812 715/856 |
| 8,018,440 | B2* | 9/2011 | Townsend | G06F 3/0416 345/173 |
| 9,122,364 | B2 | 9/2015 | Kuwabara et al. | |
| 9,336,969 | B2* | 5/2016 | Takashima | H01H 13/785 |
| 9,436,344 | B2* | 9/2016 | Kuwabara | G06F 3/048 |
| 2002/0196238 | A1 | 12/2002 | Tsukada et al. | |
| 2004/0021643 | A1* | 2/2004 | Hoshino | G06F 3/016 345/173 |
| 2004/0150631 | A1 | 8/2004 | Fleck et al. | |
| 2006/0066590 | A1 | 3/2006 | Ozawa et al. | |
| 2006/0132457 | A1* | 6/2006 | Rimas-Ribikauskas | G06F 3/04842 345/173 |
| 2006/0261983 | A1 | 11/2006 | Griffin et al. | |
| 2006/0288304 | A1 | 12/2006 | Nomoto et al. | |
| 2007/0057927 | A1 | 3/2007 | Prados | |
| 2007/0057928 | A1 | 3/2007 | Prados et al. | |
| 2007/0222768 | A1 | 9/2007 | Geurts et al. | |
| 2008/0024454 | A1 | 1/2008 | Everest | |
| 2008/0084384 | A1 | 4/2008 | Gregorio et al. | |
| 2009/0046110 | A1* | 2/2009 | Sadler | G06F 3/0488 345/660 |
| 2010/0149124 | A1 | 6/2010 | Kim et al. | |
| 2011/0102326 | A1 | 5/2011 | Casparian et al. | |
| 2011/0285659 | A1 | 11/2011 | Kuwabara et al. | |
| 2013/0207918 | A1 | 8/2013 | Kono et al. | |
| 2013/0207919 | A1 | 8/2013 | Kono et al. | |
| 2016/0266761 | A1* | 9/2016 | Kuwabara | G06F 3/0488 |

FOREIGN PATENT DOCUMENTS

| | | |
|---|---|---|
| JP | 10-500516 A | 1/1998 |
| JP | 2000-207079 A | 7/2000 |
| JP | 2001-202192 A | 7/2001 |
| JP | 2004-070492 A | 3/2004 |
| JP | 2004-234662 A | 8/2004 |
| JP | 2006-311224 A | 11/2006 |
| JP | 2008-508628 A | 3/2008 |
| JP | 2008-250924 A | 10/2008 |
| WO | 96/28777 A1 | 9/1996 |
| WO | 2009/008568 A1 | 1/2009 |

OTHER PUBLICATIONS

Office Action dated Aug. 20, 2013 issued by Japanese Patent Office for Japanese Patent Application No. 2012-286250.
Office Action dated Mar. 25, 2014 issued by Japanese Patent Office for Japanese Patent Application No. 2012-286250.

* cited by examiner

FIG. 3
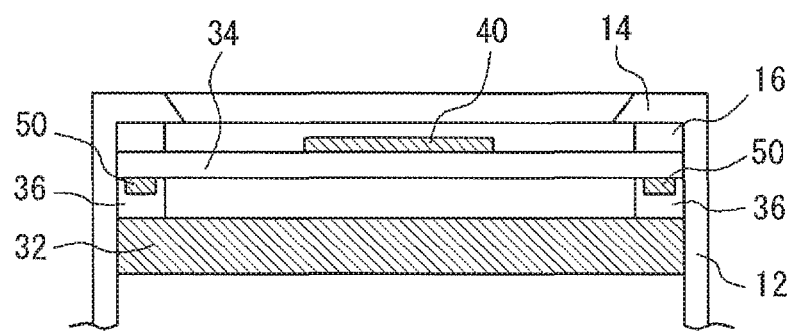
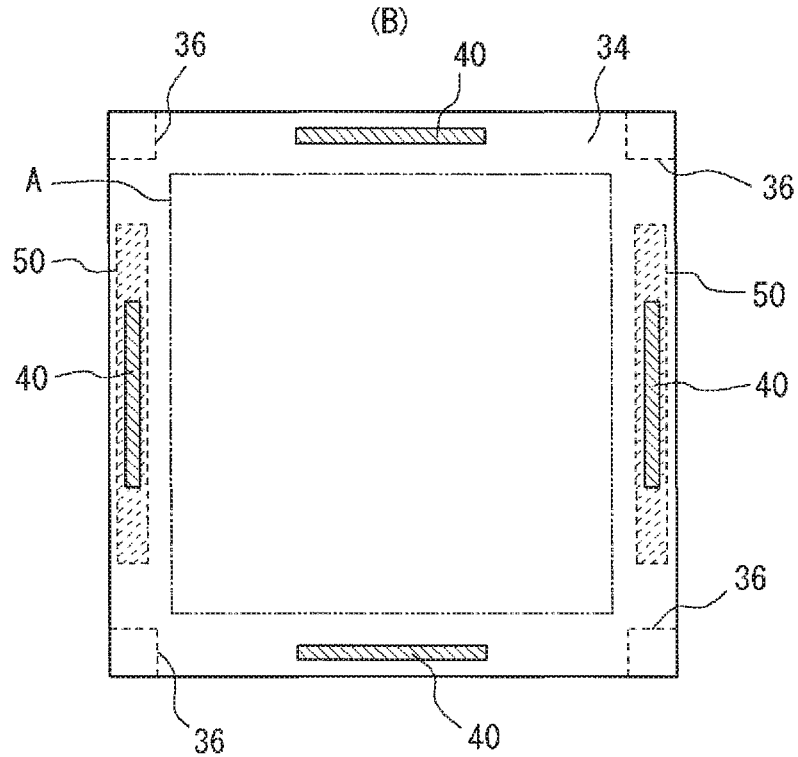

FIG. 4
(A)
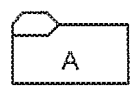
(B)
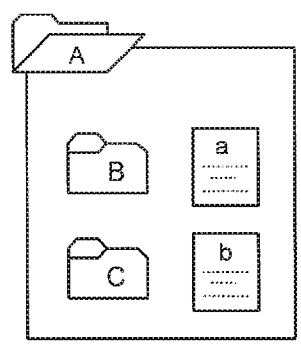
(C)
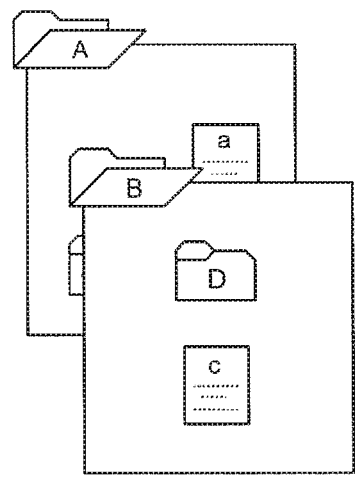

FIG. 7
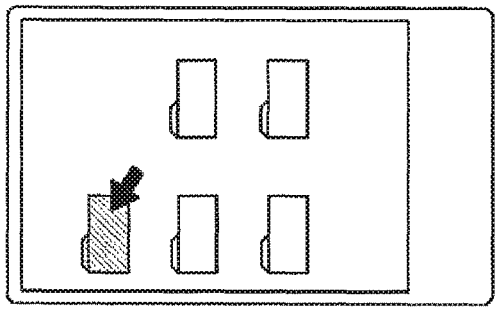
(A)
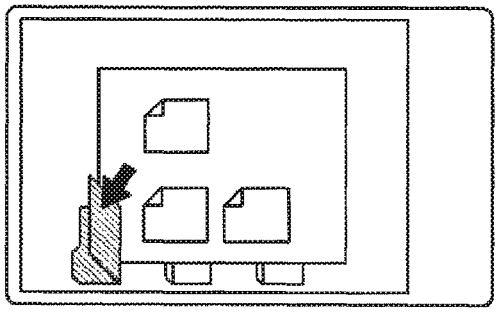
(B)
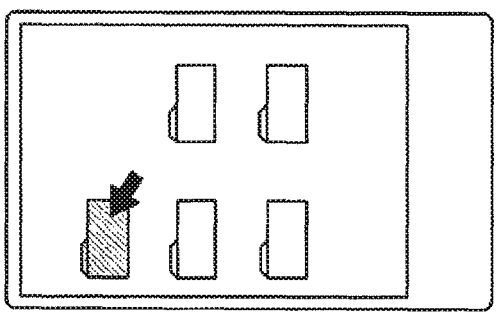
(C)
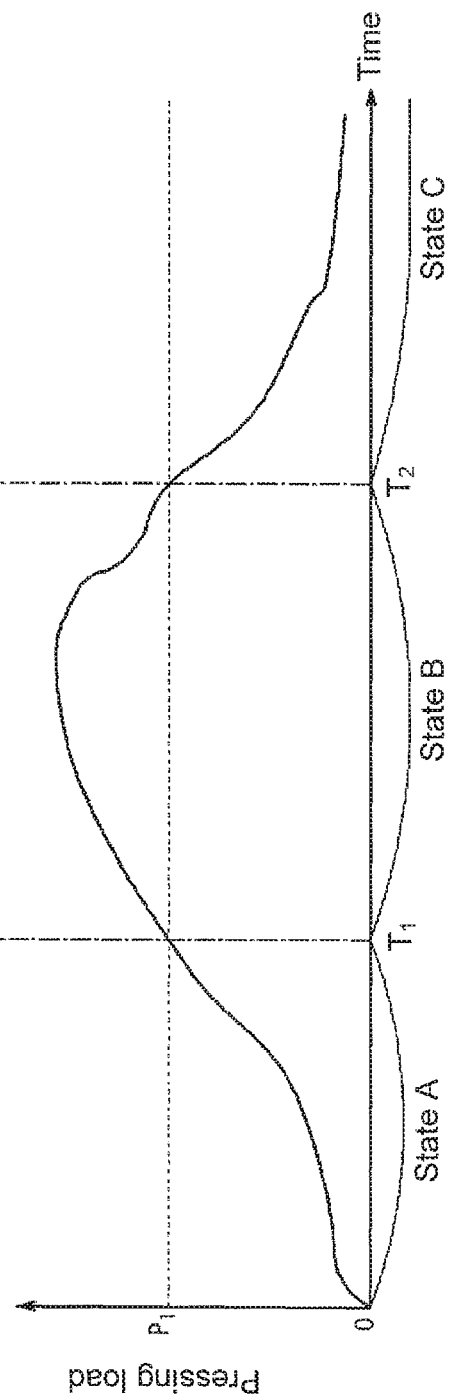

FIG. 9
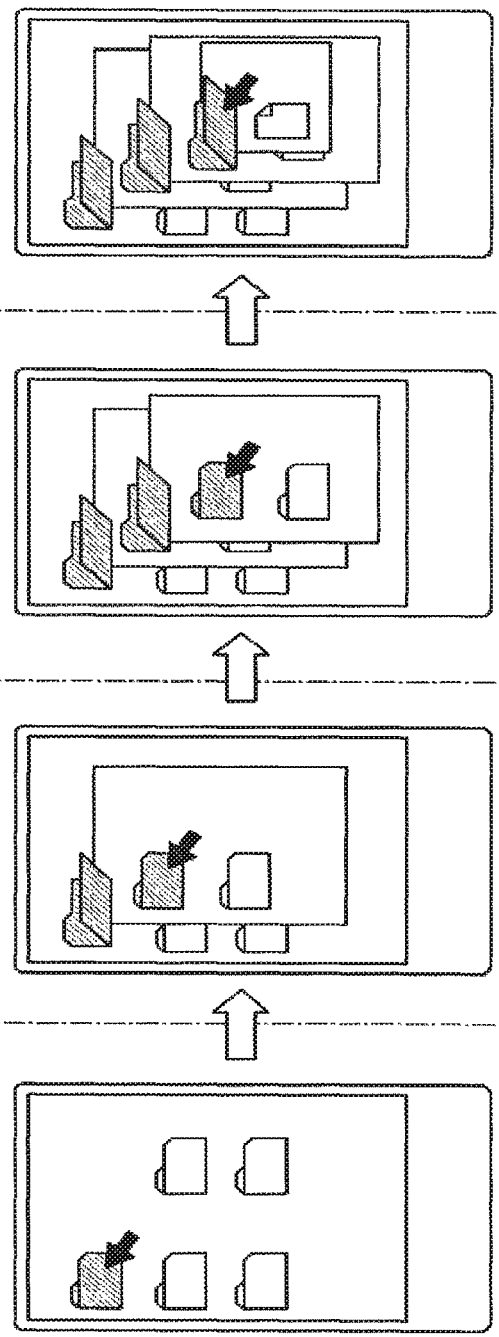
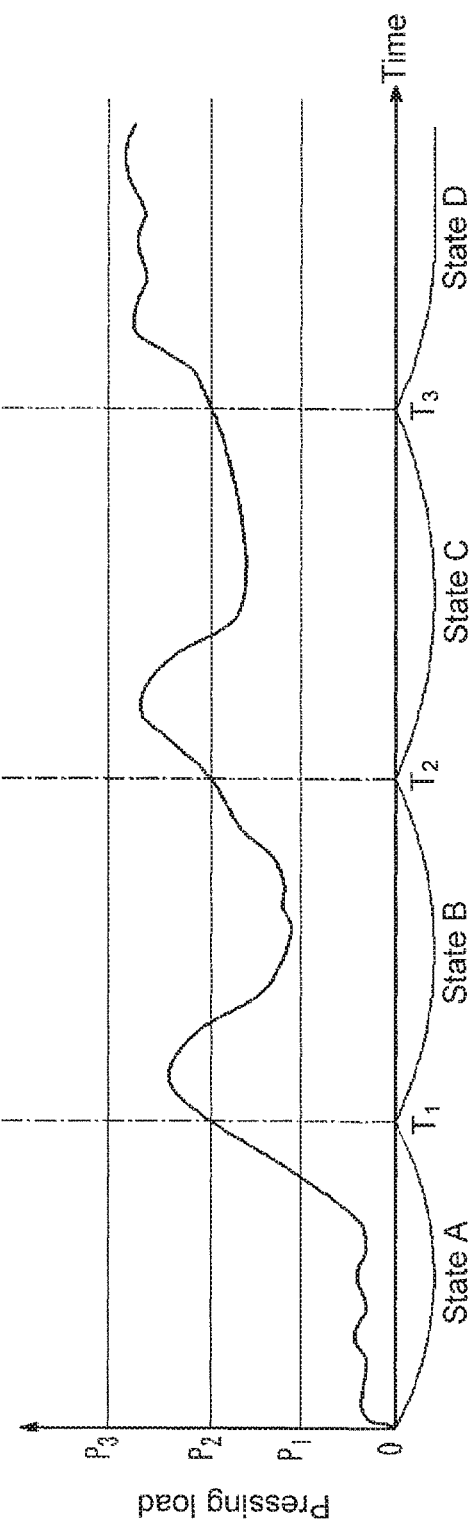

FIG. 10
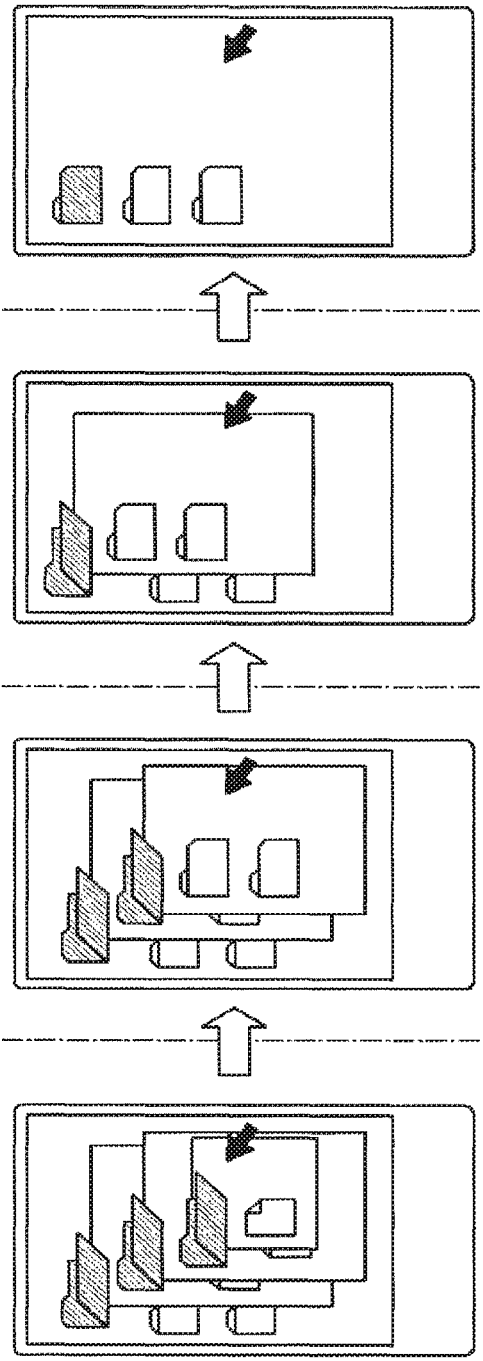
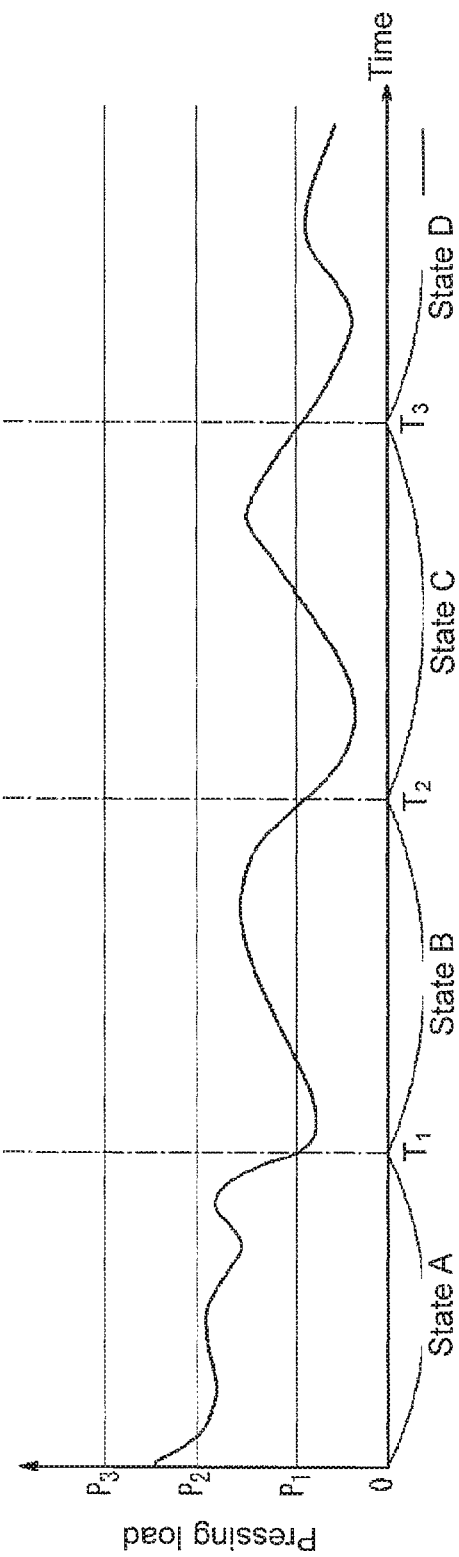

FIG. 11
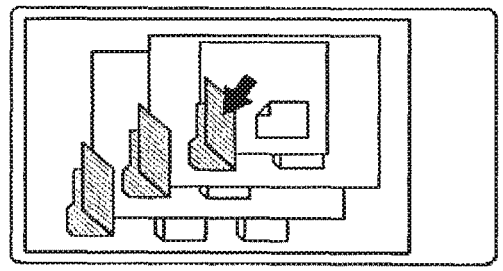
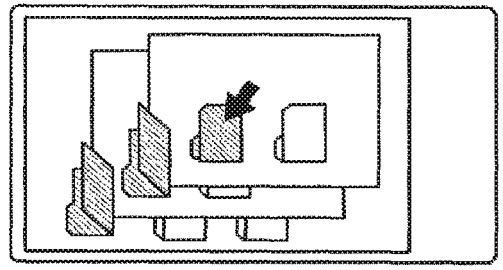
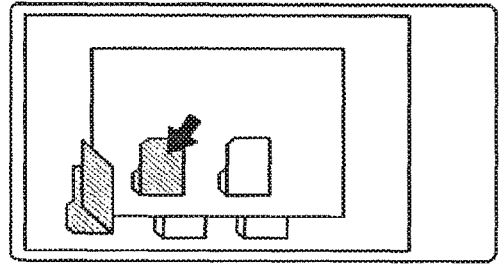
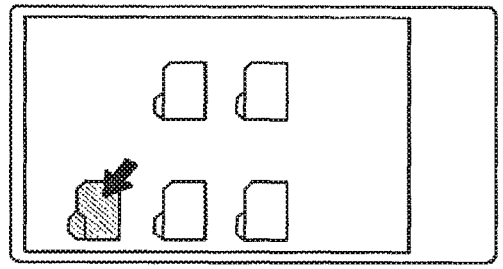
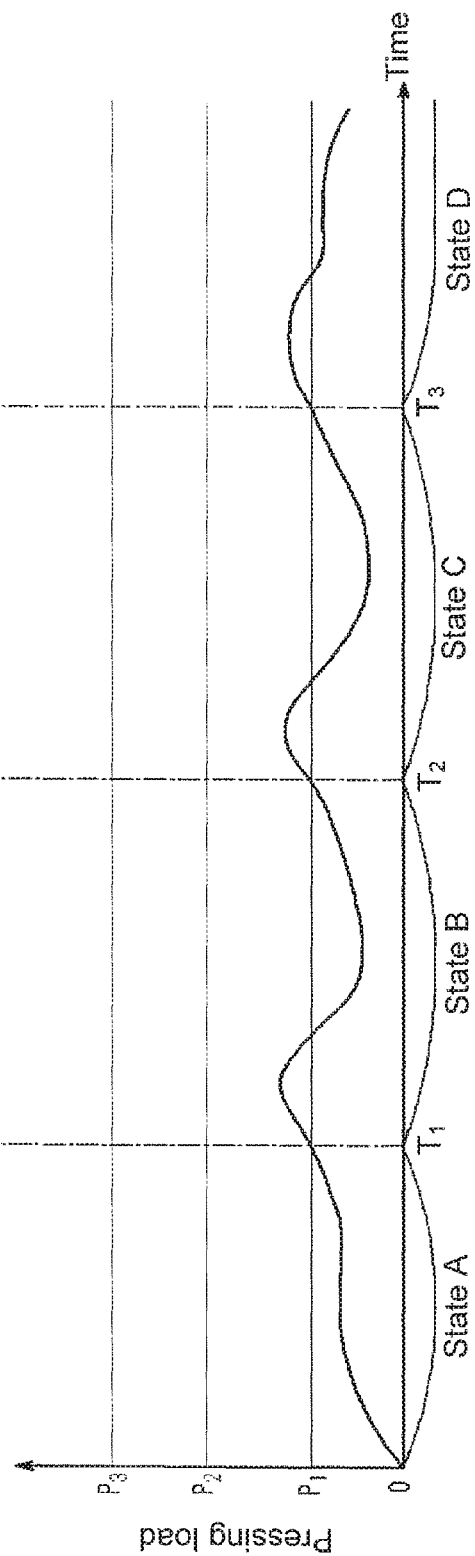

FIG. 16
(A)
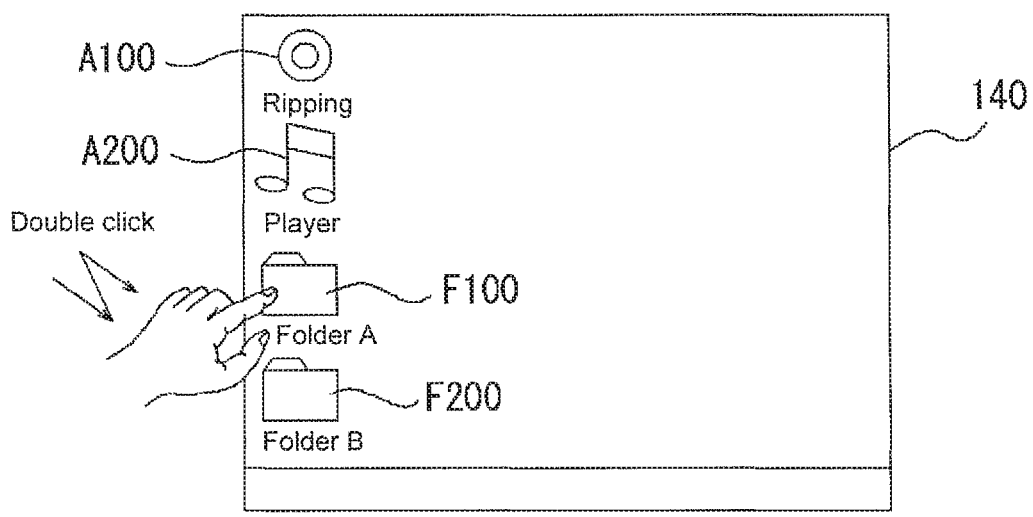
(B)
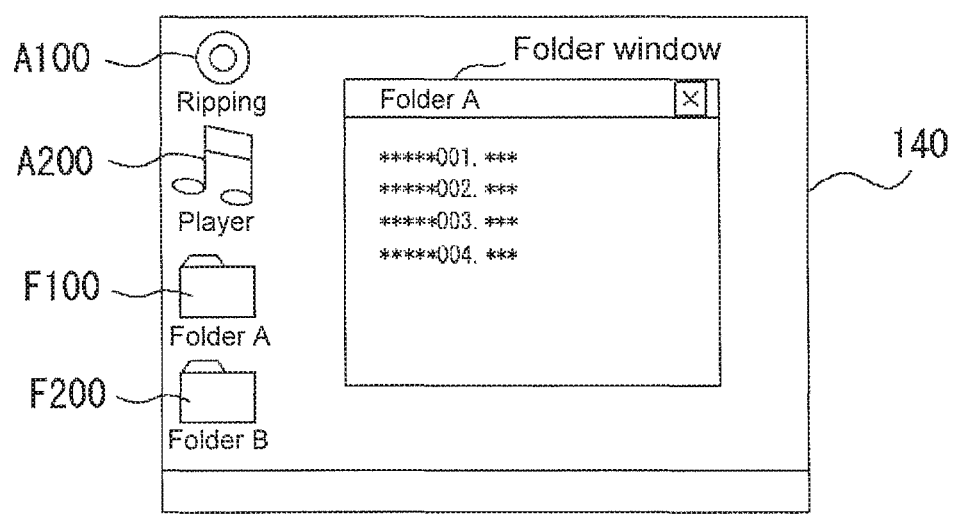

INPUT DEVICE

CROSS REFERENCES TO RELATED APPLICATIONS

The present application is a Continuation of U.S. patent application Ser. No. 15/155,426 filed May 16, 2016, which is a continuation of U.S. patent application Ser. No. 13/146,814, filed Jul. 28, 2011, which is the U.S. National Stage Entry of PCT/JP2010/000459, filed on Jan. 27, 2010, which claims the priority rights of Japanese Patent Application No. 2009-017322, filed on Jan. 28, 2009, and incorporates herein the entire disclosure of the applications for references.

TECHNICAL FIELD

The present disclosure relates to input devices and particularly relates to an input device comprising a touch panel.

BACKGROUND ART

For mobile terminals such as mobile phones, for example, various input devices that a user uses to operate a terminal have been developed according to the function or usage of each terminal. In many cases, a user conducts by directly pressing mechanical keys, buttons, or the like in many cases, which are disposed on the surface of the body of a mobile terminal, with a finger and the like.

Normally, mechanical keys (e.g. numerical keys and the like) of an input device in such a terminal are preliminarily arranged in accordance with the primary usage of the terminal. Therefore, in general, the physical key arrangement provided initially cannot be changed afterwards.

Incidentally, nowadays, as there are mobile phones installed with digital cameras or music playing functions, various kinds of functions are incorporated in small mobile terminals. There are those, such as mobile phones, installed with many auxiliary functions besides their primary terminal usage or those equipped with a plurality of primary usages in one terminal, such as schedule management or address books as in PDA (personal digital assistant) and the like. In such a terminal, if the key arrangement is fixed, sometimes a user is significantly inconvenienced during operation input depending on the function being used.

In order to eliminate such inconveniences in operation inputs, input devices have been disclosed comprising a touch panel which is configured by arranging a clear input unit on the front surface of a liquid crystal display screen consisting of a display unit (e.g. refer to Patent Document 1). Generally, an input device having such a touch panel displays an image of operation keys, buttons and the like, and characters and a string of characters prompting an input (from hereon referred as "object") on the display screen on the touch panel. If a user presses an object displayed on the display screen, an input unit corresponding to the location in the touch panel receives the input.

A folding type mobile phone described in Patent Document 1 displays objects in an arbitrary arrangement on the display screen, is capable of receiving operation inputs from a user, and is capable of configuring a free arrangement of keys and the like. As a result, the mobile phone is capable of providing very favorable operability by arbitrarily changing the arrangement of objects according to the function, every time when each function of the terminal is switched. When the user uses a digital camera function equipped in the mobile phone, for example, the mobile phone is capable of displaying on the touch panel an object that constitutes an operation part for a digital camera, and receiving operation inputs. In contrast, when a user inputs characters for e-mails and the like using the mobile phone, the mobile phone is capable of receiving inputs by displaying an object that constitutes a keyboard such as one used in a personal computer on a touch panel. In this manner, this mobile phone is capable of receiving operation inputs by respectively optimizing one input device for a plurality of functions as a result of comprising a touch panel.

Furthermore, since an input device having a touch panel receives inputs according to an input method in which a user directly contacts (touches) objects that are displayed on a display unit with a fingertip or the like, the user can conduct very intuitive operations. That is, the user conducts operations by directly touching the objects that are being displayed on a screen with a fingertip or the like, following guidance that is displayed on the screen of a touch panel. Therefore, the user can operate a terminal very easily by intuitive operations in accordance with the guidance displayed on the screen, resulting in an expected reduction in error operations.

In this manner, because of the advantages of a touch panel that can enhance the degree of freedom in configuring an input unit and that allows a user to conduct operation inputs very intuitively, there is an increasing tendency towards terminal devices with an input device comprising a touch panel.

Besides mobile terminals, such an input device having a touch panel like the one described above is provided for an ATM (Automated Teller Machine) at a bank and the like, and a ticketing machine at a station and the like, and is commonly used nowadays. Furthermore, when an employee processes an order from a customer in shops such as fast food restaurants and the like, the work is conducted using a terminal device comprising an input device with a touch panel such as one described above. By using a touch panel for an input device, mechanical operation buttons, keys or the like, such as a keyboard, besides a touch panel becomes inessential. Therefore, less space for arranging mechanical operation buttons or the like on the main body of a terminal device is required, and thus, overall down-sizing of the terminal device itself can be achieved. This, in turn, makes it possible to enhance the degree of freedom for the mounting location of a terminal device in various shops, inside train stations, and the like.

Furthermore, the operation inputs of a personal computer (PC) may also be conducted from a display that comprises a touch panel. In general, operation inputs with respect to a PC vary depending on the application program to be used (from hereon, simply referred as "application"). However, as a result of development of a GUI (Graphical User Interface), many applications have been designed to conduct intuitive operations. Moreover, even if applications to be used are different, many operations of files or folders conducted on a desktop that is displayed on a display are common due to requirements with respect to the intuitive operability. Therefore, many known operation inputs of a PC were conducted mainly by using input devices such as a keyboard or a mouse, but a user may now conduct such operation inputs very intuitively using a display comprising a touch panel.

FIG. 15 is an illustration schematically illustrating a configuration of a data transfer system that includes an information processor described in above Patent Document 2. In FIG. 15, a data transfer system 100 comprises a data storage playback device 110 and a mobile type data storage playback device (mobile type storage playback device) 120. The data storage playback device 110 has storage and playback functions of data (for example, music data), and the mobile type storage playback device 120 also has storage and playback functions of music data. The data storage playback device 110 and the mobile type storage playback device 120 are communicably connected to each other via a communication cable 130.

The data storage playback device 110 is capable of storing music data ripped from a CD or music data downloaded from a music distribution server (not shown in Figures) via a network NT. A user can transfer the music data stored in the data storage playback device 110 to the mobile type storage playback device 120 by conducting operations on the display unit comprising a touch panel 140. As a result, the data storage playback device 120 is capable of reproducing music data by storing the transferred music data even after the connection to the communication cable 130 is cut off.

FIG. 16 is an illustration schematically illustrating a user conducting operations of a folder on the display unit comprising a touch panel 140 in the data storage playback device 110. As shown in FIG. 16(A), an icon A 100 and an icon A 200 for starting up an application are displayed on the display unit with a touch panel 140. When the user directly contacts (touches) these icons with a fingertip or the like, the corresponding application starts. It is presumed to be set in such a way that the start up operation may be conducted by an operation of quickly touching twice (double touching) an icon on the display unit with a touch panel 140, which is equivalent to a double-click conducted by an input device such as a mouse. Otherwise, it is also possible to presume to be set in such a way that the operation may be conducted by touching once (single touch) an icon on the display unit with a touch panel 140, which is equivalent to a single-click conducted by an input device such as a mouse.

Furthermore, an icon F100 representing a folder A and an icon F200 representing a folder B are displayed on a display unit with a touch panel 140. Each of these folders A and B may include a plurality of files and/or more folders according to the hierarchical structure of a conventional directory. Furthermore, in the event of conducting an operation regarding these folders A and B, the user can conduct an operation corresponding to a conventional operation method of folders that has been carried out with PCs. Therefore, for example, when a user double touches (or single-touches) the icon F100 of the folder A as shown in FIG. 16(A), the data storage playback device 110 can display files that are included in the folder A as shown in FIG. 16(B). If another folder is further included in the folder A, by the user's double-touch (or single-touch), the data storage playback device 110 can display files and/or more folders that are included in the folder. In FIG. 16(B), a folder window is displayed, and files in the folder A are displayed.

RELATED ART

Patent Documents

Patent Document 1: Japanese Unexamined Patent Application Publication No. 2006-311224
Patent Document 2: Japanese Unexamined Patent Application Publication No. 2008-250924

SUMMARY OF THE DISCLOSURE

Problems to be Solved by the Disclosure

In general, in an input device such as the display unit with a touch panel 140 of the data storage playback device 110, when an operation of closing a folder window that is displaying files and the like included in a folder takes place, the user has to touch an icon as a closing operation. In FIG. 16 (B), for example, the user can close a folder window (from hereon referred as "closing" a folder) by touching an x-mark that is displayed in the upper right of the folder window. Moreover, when a file and the like included in a folder is displayed, in case of moving to the hierarchy that is immediately above in the hierarchical structure of the directory (from hereon, this operation is also referred as "closing" a folder), the user has to touch an icon such as "return" or the like.

The location of an icon to be touched in case of closing a folder is normally located separately from an icon to display (from hereon, referred as "opening" a folder) files and the like included in the folder. Therefore, to conduct a touch operation in the event of closing a folder, it is a troublesome that a user sometimes has to touch a location that is very far from the location where the touch operation was conducted in the event of opening a folder.

In order to solve the above problem, if an icon to be touched in case of closing a folder is displayed near an icon for opening a folder, for example, there is a risk of inducing an error such that the folder ends up being closed immediately after the user opens the folder.

In case of conducting an operation of a folder using a large size touch panel, if icons related to operations of opening and closing a folder are not closely displayed, it is believed that the above error may be reduced. However, in the event of conducting such an operation, the user has to conduct an operation that accompanies a major movement, and it ends up as a load or stress to the user. On the other hand, in case of conducting an operation of a folder using a small size touch panel such as a mobile terminal, icons related to the operations of opening and closing a folder have to be displayed relatively close due to the problem of limited area of the touch panel. Therefore, in this case, the risk of generating the above error increases.

Therefore, an objective of the present disclosure designed in view of such a situation is to provide an input device capable of simply and promptly conducting reliable folder operations using a touch panel.

Means for Solving the Problems

According to a first aspect of the disclosure to achieve the above objective, an input device comprises: a display unit displaying an object of a folder with a hierarchical structure; an input unit receiving pressing inputs with respect to the display unit; a load detection unit detecting a pressing load with respect to the input unit; and a control unit controlling a folder such that, if the folder is open and is displayed on the display unit and if a pressing load satisfying a predefined load standard with respect to the input unit is detected by the load detection unit, the folder which has been open is closed.

According to a second aspect of the disclosure, an input device comprises: a display unit displaying an object of a folder with a hierarchical structure; an input unit receiving pressing inputs with respect to the display unit; a load detection unit detecting a pressing load with respect to the input unit; and a control unit controlling a folder such that, if a pressing load that changes from a state of not satisfying a predefined load standard to a state of satisfying the predefined load standard is detected by the load detection unit with respect to the input unit corresponding to the location of the object of the folder that is displayed in the display unit, the folder is opened, and after the folder is opened, if a pressing load that changes from a state of satisfying the predefined load standard to a state of satisfying the predefined load standard is detected by the load detection unit, the folder which has been open is closed.

According to a third aspect of the disclosure, an input device comprises: a display unit displaying an object of a folder with a hierarchical structure; an input unit receiving pressing inputs with respect to the display unit; a load detection unit detecting a pressing load with respect to the input unit; and a control unit controlling a folder such that, if a pressing load that changes from a state of not satisfying a first load standard to a state of satisfying the predefined load standard is detected by the load detection unit with respect to the input unit corresponding to the location of the object of the folder that is displayed on the display unit, the folder is opened, and after the folder is opened, if a pressing load that changes from a state of satisfying a second load standard which is lower than the first load to a state of satisfying the predefined load standard is detected by the load detection unit, a folder in the lowest hierarchy among folders that are open is closed.

According to a fourth aspect of the disclosure, an input device comprises: a display unit displaying an object of a folder with a hierarchical structure; an input unit receiving pressing inputs with respect to the display unit; a load detection unit detecting a pressing load with respect to the input unit; and a control unit controlling a folder such that, if a pressing load that changes from a state of not satisfying a first load standard to a state of satisfying the predefined load standard is detected by the load detection unit with respect to the input unit corresponding to the location of the object of the folder that is displayed on the display unit, the folder is opened, and after the folder is opened, if a pressing load that changes from a state of satisfying a second load standard which is higher than the first load standard to a state of satisfying the predefined load standard is detected by the load detection unit, a folder in the lowest hierarchy among folders that are open is closed.

According to a fifth aspect of the disclosure, an input device comprises: a display unit displaying an object of a folder with a hierarchical structure; an input unit receiving pressing inputs with respect to the display unit; a load detection unit detecting a pressing load with respect to the input unit; and a control unit controlling a folder such that, if the folder is open and is displayed on the display unit, and if a pressing load that changes from a state of satisfying a first load standard to a state of not satisfying a second load standard which is lower than the first load standard is detected by the load detection unit with respect to the input unit, all folders which are currently open are closed.

BRIEF DESCRIPTION OF THE DRAWINGS

FIG. 3 is a diagram illustrating an exemplary assembling structure of a touch panel, a load detection unit and a vibration part of the mobile phone shown in FIG. 2.

FIG. 4 is a diagram conceptually showing how opening and closing operations are conducted with respect to folders according to the first embodiment.

FIG. 7 is a diagram showing an exemplary operation process based on the process according to the second embodiment.

FIG. 9 is a diagram showing an exemplary operation process based on a process in which the opening operation of folders according to the third embodiment is repeated.

FIG. 10 is a diagram showing an exemplary operation process based on a process in which the closing operation of folders according to the third embodiment is repeated.

FIG. 11 is a diagram showing an exemplary operation process based on a process in which the opening operation of folders according to the fourth embodiment is repeated.

FIG. 16 is a diagram schematically showing how a user conducts operations of a folder on the display unit comprising a touch panel in the data storage playback device by conventional technologies.

EMBODIMENT OF THE DISCLOSURE

Hereinafter, each embodiment of the present disclosure is described with reference to drawings. In each embodiment hereinafter, a mobile phone is described as an example of a mobile terminal with an input device of the disclosure. However, the mobile terminal to which the input device of the present disclosure may be applied is not limited to a mobile phone, but is applicable to any arbitrary mobile terminal with a touch panel such as PDA. Furthermore, the present disclosure is not limited to mobile terminal, but is applicable to any arbitrary input terminal that has a touch panel such as an ATM at a bank, a ticketing machine at a station, or the like as described above.

First Embodiment

Figure 1:
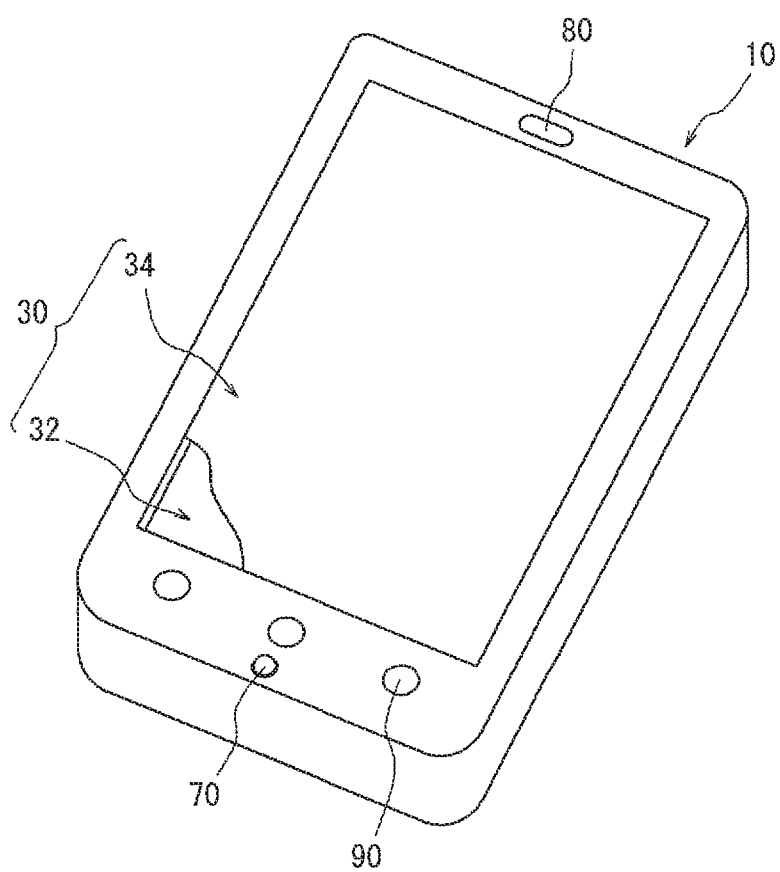
FIG. 1 is a perspective view showing an exterior of a mobile phone comprising an input device according to an embodiment of the present embodiment.

FIG. 1 is a perspective view showing an exterior of a mobile phone 10 comprising an input device according to a first embodiment of the present embodiment. The mobile phone 10 comprises a display unit 32 depicting a variety of information and shapes such as keys or buttons and displaying the arrangement on a liquid crystal display (LCD) or an organic EL display at the front surface of the terminal main body as shown by cutting out a potion. Furthermore, in the mobile phone 10, an input unit 34, which includes matrix switches and the like where inputs with a user's finger, a stylus pen and the like are received, is arranged on a front face of the display unit 32. In the present embodiment, the display unit 32 and the input unit 34 inclusively constitute a touch panel 30. The mobile phone 10 further includes a voice-input unit 70 consisting of a microphone and the like, a voice-output unit 80 consisting of a speaker and the like, and a key-input unit 90 consisting of at least one mechanical key.

In addition, the mobile phone 10 may include a digital camera function part, a one-segment broadcasting tuner, a short-range radio communication part such as an infrared communication function part and the like, and various interfaces and the like, but the drawings and detailed descriptions are omitted.

Figure 2:
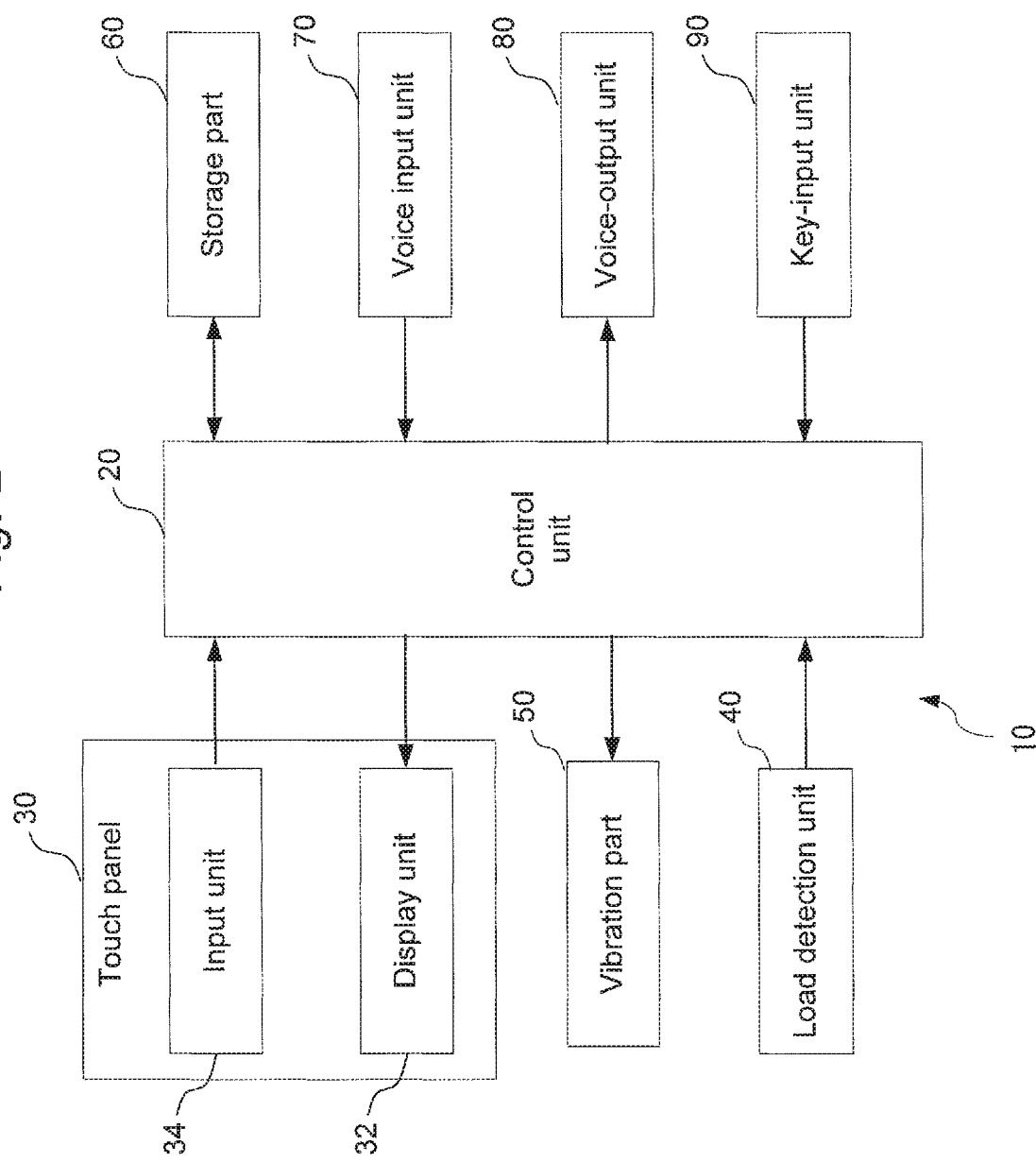
FIG. 2 is a functional block diagram showing an internal configuration of a mobile phone according to the present embodiment.

FIG. 2 is a functional block diagram schematically showing an internal configuration of the mobile phone 10. The mobile phone 10 includes a control unit 20, a touch panel 30, a load detection unit 40, a vibration part 50, a storage part 60, a voice-input unit 70, a voice-output unit 80, and a key-input unit 90 as shown in FIG. 2. The control unit 20 controls and manages the entire mobile phone 10 including each function block of the mobile phone 10. The touch panel 30 is configured by arranging, in an overlapping manner on the front face of the display unit 32, the input unit 34 where inputs from a user are received as described above. With such a configuration, the touch panel 30 receives operation inputs from the user and displays a variety of information such as input results and the like according to each application.

The input unit 34 of the touch panel 30 detects (receives) inputs by contact (pressing) with a fingertip of a user, a stylus or the like, and outputs a signal corresponding to the location where the input by the contact was detected. The touch panel 30 is configured, for example, by a publically known method such as resistive film method, capacitance method and the like. The display unit 32 displays display corresponding to each application, and renders and displays, on a predefined display region, a user interface consisting of various kinds of keys, buttons and the like for receiving operation inputs from a user with respect to the input unit 34 as well. Furthermore, the display unit 32 also displays icons of folders or files that are to be described later. Hereinafter, as described, in order to receive operation inputs from a user with respect to the input unit 34 of the touch panel 30, images such as various keys and buttons, icons of folders or files and the like to be displayed on the display unit 32 are simply described as "object."

The load detection unit 40 detects a pressing load with respect to the touch panel 30 (or to the input unit 34) and is configured, for example, with a strain gauge sensor. The vibration part 50 vibrates the touch panel 30 and is configured, for example, with a piezoelectric element, an ultrasonic transducer or the like. The relation of the load detection unit 40, vibration part 50, and the touch panel 30 in the configuration is described later.

The storage part 60 stores various applications, and various kinds of information and the like that have been input, and functions as a work memory and the like. Furthermore, the storage part 60 also stores a plurality of templates including various kinds of objects to be used in accordance with each application.

The voice-input unit 70 converts the voice of a user to input signals and sends the input signals to the control unit 20. The voice-output unit 80 converts the voice signals received from the control unit 20 to voice and outputs the voice. The key-input unit 90 sends a corresponding signal to the control unit 20 according to the operation input from the user. The usage and the function are defined for various keys constituting the key-input unit 90 in accordance with the application to be used.

The mobile phone 10 further comprises various functioning parts required for providing functions as a normal mobile phone such as an antenna, a radio communication part and the like for transmitting/receiving a variety of information such as voice communications and e-mail data to/from a base station via internet, wireless communications or the like. However, there is nothing different from publicly known technologies with regard to these; hence, the description is omitted.

Next, the relation of the above-mentioned load detection unit 40 and vibration part 50, and touch panel 30 is described.

FIG. 3 is a diagram illustrating an exemplary assembling structure of touch panel 30, a load detection unit 40 and a vibration part 50 of the mobile phone 10 shown in FIG. 2. FIG. 3(A) is a cross-sectional view of the main part and FIG. 3(B) is a plan view of the main part.

The display unit 32 displaying various kinds of objects on the touch panel 30 is housed and held within a housing 12. An input device according to the present embodiment holds an input unit 34 on the display unit 32 via an insulator 36 that is composed of a resilient member. In the input device according to the present embodiment, the display unit 32 and the input unit 34 have a rectangular-shape with a plan view. Although the touch panel 30 is shown as a square in FIG. 3, the touch panel 30 may also be a rectangle according to the specifications of a mobile terminal in which the touch panel 30 is installed. Furthermore, the input device holds the input unit 34 on the display unit 32 via the insulator 36 that is arranged at four corners shown by dotted lines away from the display region A of the display unit 32 as shown in FIG. 3(B).

An upper cover 14 is provided for the input device in the housing 12 to cover the surface region of the input unit 34 that is outside the display region of the display unit 32, and the insulator 16 composed of a resilient member is arranged between the upper cover 14 and the input unit 34.

The surface of the input unit 34, that is, the face where operation inputs are received, for example, is composed of a clear film, and the back face is composed of glass. The input unit 34 has a structure allowing the clear film on the surface slightly warp (strain) in response to the pressed force when the operating surface is pressed.

In the input device according to the present embodiment, strain gauge sensors for detecting a pressing load (pressing force) applied to the input unit 34 is respectively provided by bonding or the like, in the vicinity of each side that is covered by the upper cover 14, on the clear film of the surface of the input unit 34. Furthermore, in the input device, piezoelectric elements, ultrasonic transducers or the like for vibrating the input unit 34 are respectively provided by bonding or the like, at the vicinity of two facing sides on the glass surface of the back face of the input unit 34. That is, the input device shown in FIG. 3 includes the load detection unit 40 shown in FIG. 2 constituted by four strain gauge sensors, and the vibration part 50 constituted by two transducers. The vibration part 50 can generate vibrations and deliver the vibration to the fingertip of the user that is pressing the input unit 34, or a pressing object such as a stylus pen and the like. Furthermore, the vibration part 50 drives, for example, two supersonic transducers in the same phase. The illustration of the housing 12, upper cover 14 and insulator 16 shown in FIG. 3A are omitted in FIG. 3B.

In the input device according to the present embodiment, the control unit 20 monitors inputs detected at the input unit 34 and also monitors pressing loads detected at the load detection unit 40. The control unit 20 is capable of determining whether or not the pressing load detected at the load detection unit 40 satisfies a predefined load standard (standard value). The load detection unit 40 detects, for example, a load from the average value of the outputs from the four strain gauge sensors.

Herein, the "predefined load standard" is the standard of a pressing load detected at the load detection unit 40 set as a standard for conducting opening/closing operations of a folder to be described later. The predefined load standard may be set from the initial settings of the mobile phone 10 or from changes to the settings made by the user. Furthermore, the load detection unit 40 is capable of detecting a pressing load, which changes from a state of not satisfying a predefined load standard to a state of satisfying the predefined load standard, with respect to the input unit 34 by monitoring temporal changes in the pressing load. Likewise, the load detection unit 40 is also capable of detecting a pressing load, which changes from a state of satisfying a predefined load standard to a state of satisfying the predefined load standard, with respect to the input unit 34 by monitoring temporal changes in the pressing load.

The value of a load standard is regarded as the "threshold value of a pressing load" and an aspect of determining that "the load standard is satisfied" in case of reaching the value of the load standard has been described thus far. Hereinafter, although a determining case according to such an aspect is described, the aspect determined as "the load standard is satisfied" is not limited to this, but presumably many aspects are presumed to be included. When a pressing load by a pressing input from a user with respect to an object happens to exceed the above value of the load standard, for example, it is possible to determine that "the load standard is satisfied." Furthermore, when the load detection unit 40 detects a pressing load indicating the above value of the load standard, it is also possible to determine that "the load standard is satisfied."

The same is true in an aspect where it is possible to determine that "the load standard is not satisfied." That is, in the following description, a case determining that "the load standard is not satisfied" is described if the value falls below the load standard. However, when the pressing load by a pressing input by the user with respect to an object happens to be below the above value of the load standard, it is also possible to determine that "the load standard is not satisfied." Moreover, if a pressing load indicating the above value of the load standard is no longer detected by the load detection unit 40, it is also possible to determine that "the load standard is not satisfied."

Next, opening and closing operations of folders according to the present embodiment are described. FIG. 4 is a diagram conceptually showing how opening and closing operations are conducted with respect to folders by an input device according to the present embodiment. In the present embodiment, folders based on the concept of a hierarchical structure of directories that is widely used in basic software of conventional operation system (OS) and the like are used. Therefore, in the present embodiment, each folder can include a plurality of files and/or more folders therein.

In the input device according to the present embodiment, displaying the content (object) of files and/or other folders included in one folder to inform the content of the folder to the user is stated as "opening" the folder. For example, if Folder A shown in FIG. 4(A) includes Folder B, Folder C, File a and File b, the content included in the Folder A is displayed as shown in FIG. 4(B) when the Folder A is opened. Moreover, for example, if the Folder B shown in FIG. 4(B) includes Folder D and File c, the content included in the Folder B is displayed as shown in FIG. 4(C) when the Folder B is opened.

In the input device according to the present embodiment, when one folder is opened and the content of the folder is displayed, returning to a state in which the content is not displayed is stated as "closing" the folder. In FIG. 4(C), for example, content included in the folder B (folder D as well as file c) are displayed, but a content shown in FIG. 4(B) is displayed when the Folder B is closed. Moreover, in FIG. 4(B), the content included in the folder A (folder B, folder C, file a, and file b) are being displayed, but closing the folder A brings a display such as the one shown in FIG. 4(A).

Next, detection of a pressing load with respect to the touch panel 30 of the input device according to the present embodiment is described.

The input device according to the present embodiment can cause the display unit 32 of the touch panel 30 to display objects of a folder having a hierarchical structure as shown in FIG. 4. In this event, the input unit 34 of the touch panel 30 receives a pressing input with respect to the display unit 32 by a fingertip of the user, a stylus or the like. In this manner, when the pressing input is applied to the input unit 34, the load detection unit 40 detects the pressing load with respect to the input unit 34.

Figure 5:
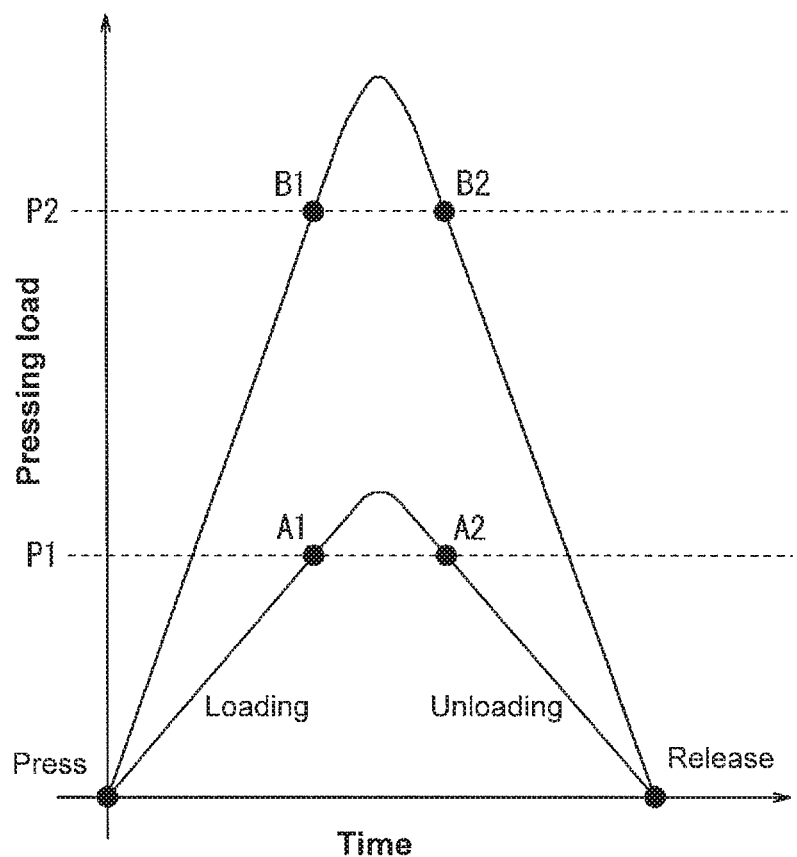
FIG. 5 is a graph schematically showing exemplary temporal changes of a pressing load detected by a load detection unit when a user presses an input unit of the touch panel.

FIG. 5 is a diagram showing an example in which a pressing load with respect to the input unit 34 by a fingertip of the user, a stylus or the like is detected by the load detection unit 40. FIG. 5 schematically shows exemplary temporal changes of a pressing load detected by the load detection unit 40 when the user conducts operation inputs by pressing the input unit 34 of the touch panel 30. In general, in the event of conducting an operation to press (pressing input) the input unit 34 of the touch panel 30, the user keeps increasing the pressing force with respect to the input unit 34 (that is, conducting an operation to press at the input unit 34) after touching the input unit 34 until the time when the user can determine that the input has been received. Furthermore, the user reduces the pressing force with respect to the input unit 34 (that is, an operation to release a finger from the input unit 34 takes place) from the time when the user determines that the input was received. Therefore, as shown by the curve in FIG. 4, the pressing load detected by the load detection unit 40 initially increases upwardly as the elapse of time from left to right and decreases downwardly during the course.

When the user conducts a normal operation input with respect to the input unit 34, since a pressing input is applied based on the normal pressing force, the load detection unit 40 detects, for example, the pressing load undergoing changes from A1 to A2 as shown in FIG. 5. On the other hand, when the user conducts an operation input with more pressing force than a normal operation input with respect to the input unit 34, since the pressing input is intentionally applied with more pressing force than a normal pressing force, the load detection unit 40 detects, for example, the pressing load undergoing changes from B1 to B2 as shown in FIG. 5.

In this manner, in the present embodiment, using the load detection unit 40 makes it possible to distinguish and detect a load standard (for example, P1 in FIG. 5) presuming a normal operation input by a normal pressing force and a load standard (for example, P2) presuming an operation input by a pressing force that is more powerful than normal. Furthermore, in case of setting a load standard as in P1 shown in FIG. 5, for example, it is possible to distinguish a pressing input (A1 in FIG. 5) changing from a state of not satisfying the load standard to a state of satisfying the predefined load standard from a pressing input (A2 in FIG. 5) changing from a state of satisfying the load standard to a state of satisfying the predefined load standard. Therefore, in the present embodiment, by distinguishing these two inputs, separate operations may be assigned respectively.

Next, a closing process of folders according to the present embodiment is described. The closing process of folders according to the first embodiment is a process conducted in a state in which a folder has been opened and is displayed on the display unit 32. In the present embodiment, if the load detection unit 40 detects a pressing load that satisfies a predefined load standard with respect to the input unit 34 while a folder is in an open state, the control unit 20 closes the folder that is open.

If P1 as shown in FIG. 5 is set, for example, as a load standard to conduct normal operation inputs (operations to open a folder and the like), P2 shown in FIG. 5 preferably set as a load standard to conduct operation inputs using a more powerful force than normal is preferably set as a predefined load standard. That is, if the load detection unit 40 detects a pressing load satisfying the load standard P2 shown in FIG. 5 with respect to the input unit 34 while a folder is in an open state, the control unit 20 closes the folder that has been opened. Thereby, the user can close the folder on the display unit 32 while conducting operations of the folder using the touch panel 30 of the mobile phone 10 by pressing an arbitrary location of the input unit 34 of the touch panel 30 with a force slightly more powerful than normal.

For example, if a display as shown in FIG. 4(C) is displayed on the display unit 32 of the touch panel 30, the user can have a display as shown in FIG. 4(B) by pressing an arbitrary location of the input unit 34 with a force slightly more powerful than normal to close the folder B that has been opened. Furthermore, if a display as shown in FIG. 4(B) is being displayed on the display unit 32, the user can have a display as shown in FIG. 4(A) by pressing an arbitrary location of the input unit 34 with a slightly more powerful force than a normal pressing force to close the folder A that has been opened.

In the present embodiment a folder may be closed by a user operation that is simple and easily differentiated from other operations without providing a separate icon (object) to close the folder. Therefore, according to the mobile phone 10 in the present embodiment, the user is able to conduct reliable folder operations simply and swiftly using a touch panel.

Second Embodiment

Next, a closing process of folders according to the second embodiment of the present disclosure is described.

The second embodiment has a change in the closing process of a folder conducted by the control unit 20 in the mobile phone 10 described in the first embodiment. Therefore, descriptions that are the same as the first embodiment are omitted. The closing process according to the present embodiment is a process related to the opening operation of a folder; hence, the closing process according to the present embodiment as well as the opening process of a folder according to the present embodiment is described.

Figure 6:
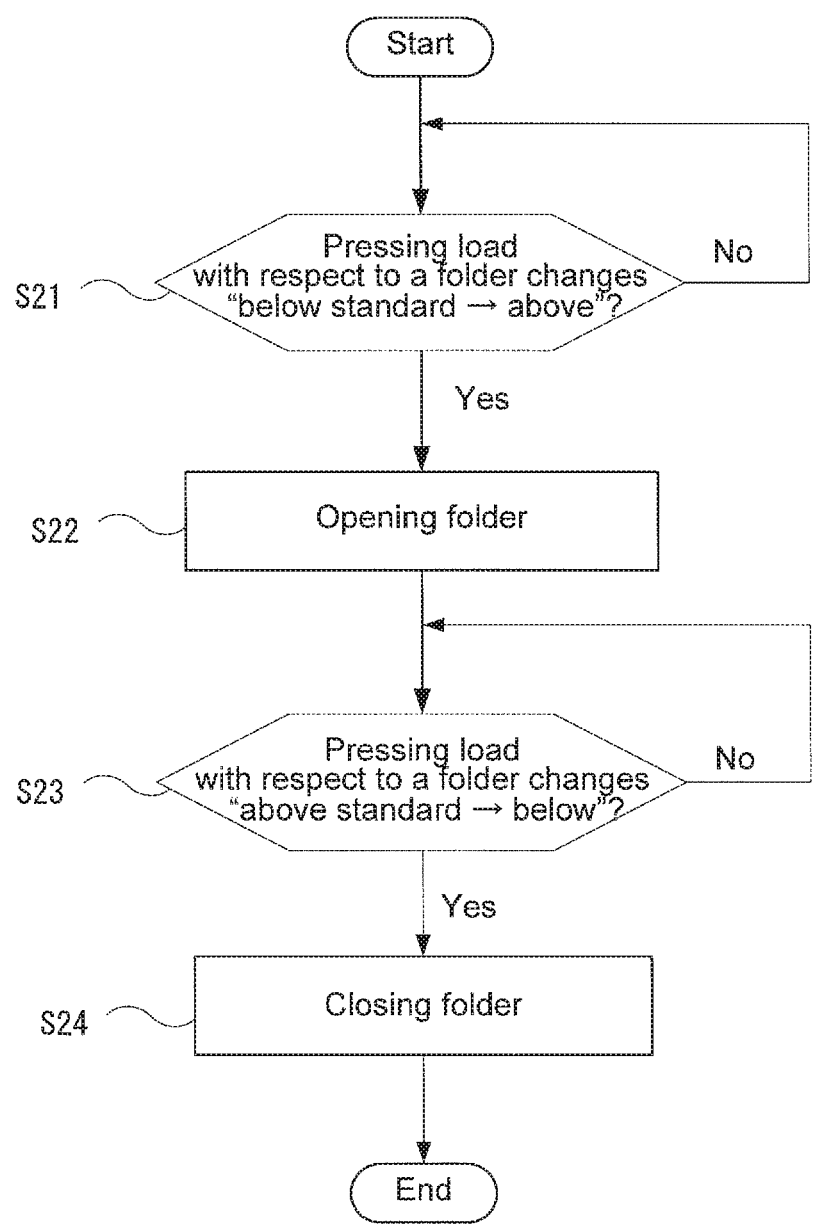
FIG. 6 is a flow diagram of an opening/closing process of a folder according to the second embodiment.

FIG. 6 is a flow diagram of an opening/closing process of a folder according to the second embodiment. The present process starts at a point when the input unit 34 of the touch panel 30 detects a pressing input by a finger of a user and the like. Even at the starting point of the present process, it is presumed that an object of the folder is displayed on the display unit 32. If an input is detected at the input unit 34 by a pressing input with respect to the input unit 34 corresponding to the location of the object of the folder, the control unit 20 determines whether or not the load detection unit 40 has detected the pressing load changing from a state of not satisfying a predefined load standard to a state of satisfying the predefined load standard (Step S21). In the flow chart of FIG. 6, to simplify the statement, "from a state of not satisfying the standard to a state of satisfying the predefined load standard" is simply stated as "below standard→above." Furthermore, "from a state of satisfying the standard to a state of satisfying the predefined load standard" is simply stated as "above standard→below."

If the load detection unit 40 detects the pressing load changing from a state of not satisfying a predefined load standard to a state of satisfying the predefined load standard in Step S21, the control unit 20 opens the folder (Step S22). That is, the control unit 20 displays, on the display unit 32, icons (object) of files and/or folders that are included in the hierarchy that is immediately below the folder to be opened.

After the folder is opened in Step S22, the control unit 20 determines whether the load detection unit 40 has detected the pressing load changing from a state of satisfying a predefined load standard to a state of satisfying the predefined load standard (Step S23). If the pressing load changing from a state of satisfying a predefined load standard to a state of satisfying the predefined load standard is detected by the load detection unit 40 in Step S23, the control unit 20 closes the folder that has been opened (Step S24). That is, the control unit 20 brings the icons of files and/or other folders included in the hierarchy that is immediately below the folder that is open back to a not displaying state on the display unit 32.

FIG. 7 is a diagram showing an exemplary operation process based on the process according to the above-mentioned second embodiment. In the event of conducting the aforementioned process, temporal changes of the pressing load with respect to the input unit 34 of the touch panel 30 detected by the load detection unit 40 is shown at a lower part of FIG. 7 and an exemplary drawing of the accompanying display changes of the display unit 32 is shown at a higher part of FIG. 7. In FIG. 7, a predefined load standard described in the above-mentioned process is indicated as "load standard P1."

State A as shown in FIG. 7(A) indicates how pressing force applied to a pressing input increases after a user has touched the input unit 34 of the touch panel 30 with a fingertip or the like. In FIG. 7(A), hatching is added to show an object of a folder corresponding to the location of the input unit 34 where an input is detected. In this manner, if an object such as a folder, a file and the like is present at a location of the input unit 34 where the input is detected, in order to show the user that an input corresponding to the object has been detected, a process such as adding a color to the object or the like is preferably carried out by the control unit 20. An arrow attached to the folder that is shown by adding hatching in FIG. 7(A) indicates that an input by a user's fingertip and the like has been detected at the location. Such an object indicating an input location can be set to be displayed or not to be displayed on the display unit 32.

If a pressing load pressing the input unit 34 of the touch panel 30 by the user changes from a state of not satisfying the load standard P1 to a state of satisfying the predefined load standard (Step S21: Yes branch), the control unit 20 opens the folder that is being pressed as shown in FIG. 7(B) (Step S22). Thereafter, while the file is open, if the pressing load applied by the user pressing the input unit 34 changes from a state of satisfying the load standard P1 to a state of satisfying the predefined load standard (Step S23: Yes branch), the control unit 20 closes the folder that has been opened as shown in FIG. 7(C) (Step S24). The input, of which a pressing load changes from the state of satisfying a predefined load standard P1 to a state of satisfying the predefined load standard at the time of closing a folder, may be located at the object of the folder that was open or may also be located at other than the folder.

The user can also select or execute other folders, files or the like that are included in the opened folder in a state shown in FIG. 7(B). In this case, the mobile phone 10 receives, on the input unit 34, an input of which the input location is moved to the object of a folder or a file desired by the user while maintaining the pressing load that satisfies P1. After the input of which the input location is moved to the object of another folder or a file that is included in the opened folder is detected, the mobile phone 10 receives, at the load detection unit 40, an input with respect to the object satisfying a load standard that is set higher than P1. If an input with respect to the object satisfying the load standard that is higher than P1 is detected, the control unit 20 selects or executes a folder or a file related to the object.

In this manner, there is no need to separately provide an icon for closing a folder in the present embodiment. Furthermore, a folder can be opened and the folder that has been opened can be closed by the user operation that is simple and easily differentiated from other operations. Therefore, according to the mobile phone 10 of the present embodiment, the user can conduct reliable folder operations simply and promptly using a touch panel.

Third Embodiment

Next, a closing process of folders according to the third embodiment of the present disclosure is described.

The third embodiment has a change in the closing process of a folder conducted by the control unit 20 in the mobile phone 10 described in the first embodiment similar to the above-described second embodiment. Therefore, descriptions that are the same as the first and second embodiments are omitted. In addition, the closing process according to the present embodiment is a process related to the opening operation of a folder; hence, the closing process according to the present embodiment as well as the opening process of a folder according to the present embodiment is described.

In the present embodiment, a first load standard and a second load standard are set as standards for conducting the opening or closing operations of folders. In the present embodiment, the second load standard is set to be a standard that is lower than the first load standard.

Figure 8:
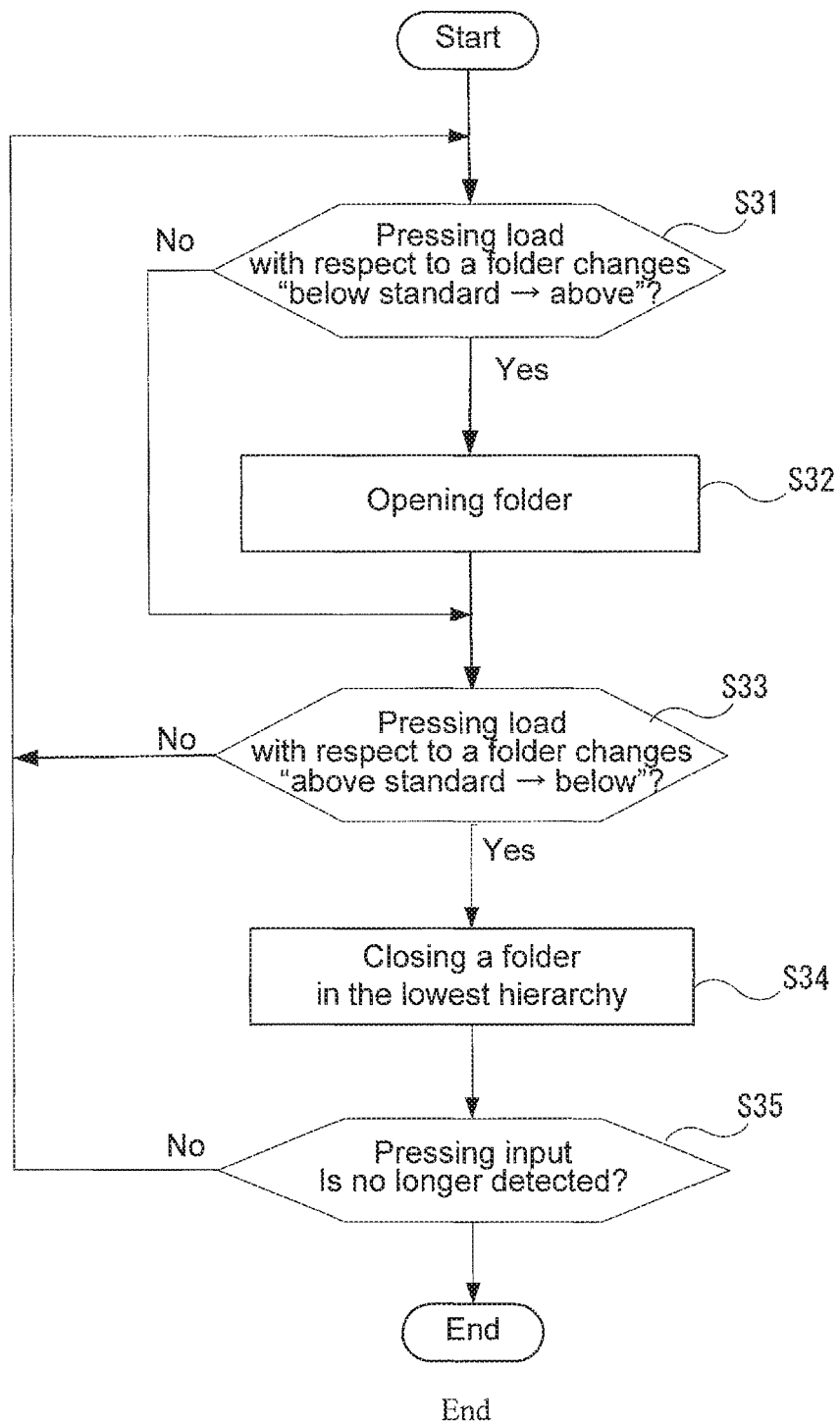
FIG. 8 is a flow diagram for showing how opening/closing a folder are processed according to the third embodiment.

FIG. 8 is a flow diagram for showing how an opening/closing process of a folder according to the third embodiment. The present process starts at a point when the input unit 34 of the touch panel 30 detects a pressing input by a finger of a user and the like. Even at the starting point of the present process, it is presumed that an object of the folder is displayed on the display unit 32. If an input is detected at the input unit 34 by a pressing input with respect to the input unit 34 corresponding to the location of the object of the folder, the control unit 20 determines whether or not the load detection unit 40 has detected the pressing load changing from a state of not satisfying the above-mentioned first load standard to a state of satisfying the predefined load standard (Step S31).

If the load detection unit 40 detects the pressing load changing from a state of not satisfying the first load standard to a state of satisfying the predefined load standard in Step S31, the control unit 20 opens the folder (Step S32). After the folder is opened in Step S32, the control unit 20 determines whether or not the load detection unit 40 has detected the pressing load changing from a state of satisfying a second load standard that is lower than the first load standard to a state of satisfying the predefined load standard (Step S33).

If a pressing load changing from a state of satisfying the second load standard that is lower than the first load standard to a state of satisfying the predefined load standard is not detected in Step S33, the control unit 20 returns to Step S31 and continues the process. Here, if another folder included in the folder that has been opened is displayed on the display unit 32, the mobile phone 10 is capable of receiving an input that the user moves an input location to the object of the other folder while the pressing load with respect to the input unit 34 is being detected. At this time, in Step S31, if a pressing load that changes from a state of not satisfying the first load standard to a state of satisfying the predefined load standard is detected with respect to the input unit 34 corresponding to the location of the object of the other folder, the control unit 20 opens the other folder in Step S32. In the present embodiment, since such a process may be repeated, the user is able to open folders included in the hierarchy that is immediately below the folder one after another.

FIG. 9 is a diagram showing an exemplary operation process based on a process in which the opening operation of above-mentioned folders is repeated. In FIG. 9, the first load standard described in the above process is indicated as "load standard P2."

In FIG. 9(A), the user is pressing the upper left folder on the input unit 34 of the touch panel 30. While the user is pressing the folder, if the pressing load pressing the input unit 34 changes from a state of not satisfying a predefined load standard P2 to a state of satisfying the predefined load standard (Step S31: Yes branch), the control unit 20 opens the folder that is being pressed as shown in FIG. 9(B) (Step S32). Thereafter, if the user moves the location of the pressing input to a location of another folder that is included in the opened folder while pressing the input unit 34, it is assumed to be the state shown in FIG. 9(B). In this state, if the pressing load by the user pressing the input unit 34 changes from a state of not satisfying the predefined load standard P2 to a state of satisfying the predefined load standard (Step S31: Yes branch), the control unit 20 opens the folder that is being pressed as shown in FIG. 9(C) (Step S32). Even after this, the user can open the folder shown in FIG. 9(C) by conducting the same operation as shown in FIG. 9(D).

In this manner, in the present embodiment, the user can consecutively conduct opening operations of folders smoothly without releasing a finger from the input unit 34 of the touch panel 30. In case of detecting a pressing load that changes from a state of not satisfying the first load standard to a state of satisfying the predefined load standard with respect to the input unit 34 corresponding to the location of the object of a file, not a folder, the control unit 20 preferably starts an application to open the file.

On the other hand, if a pressing load changing from a state of satisfying the second load standard that is lower than the first load standard to a state of satisfying the predefined load standard is detected in Step S33, the control unit 20 closes a folder that is open on the display unit 32 (Step S34). In this case, the control unit 20 closes a folder in the lowest hierarchy among folders that are open on the display unit 32. After Step S34, the control unit 20 determines whether a pressing input on the input unit 34 has been detected or not and if detected, the process continues by returning to Step S31. If no longer detected, the process ends. In this manner, in the present embodiment, the user is also able to repeat the closing process of a folder without releasing their finger from the input unit 34 of the touch panel 30. Therefore, the user is able to return to a folder in the hierarchy immediately above by closing the folder of the lowest hierarchy.

FIG. 10 is a diagram showing an exemplary operation process based on a process in which the closing operation of above-mentioned folders is repeated. In FIG. 10, the second load standard described in the above-mentioned process is indicated as "load standard P1."

In FIG. 10(A), three folders are displayed on the display unit 32 in an open state. That is, FIG. 10(A) shows a state in which the content of folders from the highest level to the third hierarchy is displayed. Then, if a pressing load by the user pressing the input unit 34 of the touch panel 30 changes from a state of satisfying the predefined load standard P1 to a state of satisfying the predefined load standard (Step S33: Yes branch), the control unit 20 closes the folder in the lowest hierarchy (the third in the hierarchy) as shown in FIG. 9(B) (Step S34). Thereafter, if the pressing load pressing the input unit 34 again changes from a state of satisfying the predefined load standard P1 to a state of satisfying the predefined load standard (Step S33: Yes branch), the control unit 20 closes the folder in the lowest hierarchy (the second in the hierarchy) as shown in FIG. 9(C) (Step S34). Even after this, the user can close the folder shown in FIG. 9(C) by conducting the same operation as shown in FIG. 9(D).

As described, in the present embodiment, the user is able to consecutively conduct closing operations of folders smoothly without releasing their finger from the input unit 34 of the touch panel 30. Also in the present embodiment, in the event of closing a folder, the input of which a pressing load changes from a state of satisfying the second load standard P1 to a state of satisfying the predefined load standard may be conducted by the user at an arbitrary location of the input unit 34.

In the present embodiment, since the load standard for closing a folder is set lower than the load standard for opening a folder, it is expected to significantly reduce the risk of error that a user unintentionally closes a folder in addition to the above-mentioned advantages in the second embodiment.

Fourth Embodiment

Next, a closing process of folders according to the fourth embodiment of the present disclosure is described.

In the fourth embodiment, the superior-inferior relationship of the first load standard and the second load standard is reversed in the above-mentioned third embodiment. Therefore, descriptions that are the same as the third embodiment are omitted. In the present embodiment, a first load standard and a second load standard are set as standards for conducting the opening or closing operations of folders. In the present embodiment, the second load standard is set to be a standard that is higher than the first load standard.

In the fourth embodiment, the opening or closing operations of folders may be conducted based on the flow diagram shown in FIG. 8 described in the third embodiment. Therefore, the detail explanation of the operations is omitted.

FIG. 11 is a diagram showing an exemplary operation process based on a process in which the opening operation of folders according to the fourth embodiment is repeated. In FIG. 11, the first load standard in the present operation is indicated as "load standard P1." In the fourth embodiment, a user is able to consecutively conduct opening operations of folders smoothly without releasing a finger from the input unit 34 of the touch panel 30 by a pressing force that is weaker than that of the opening process of folders described in the third embodiment.

Figure 12:
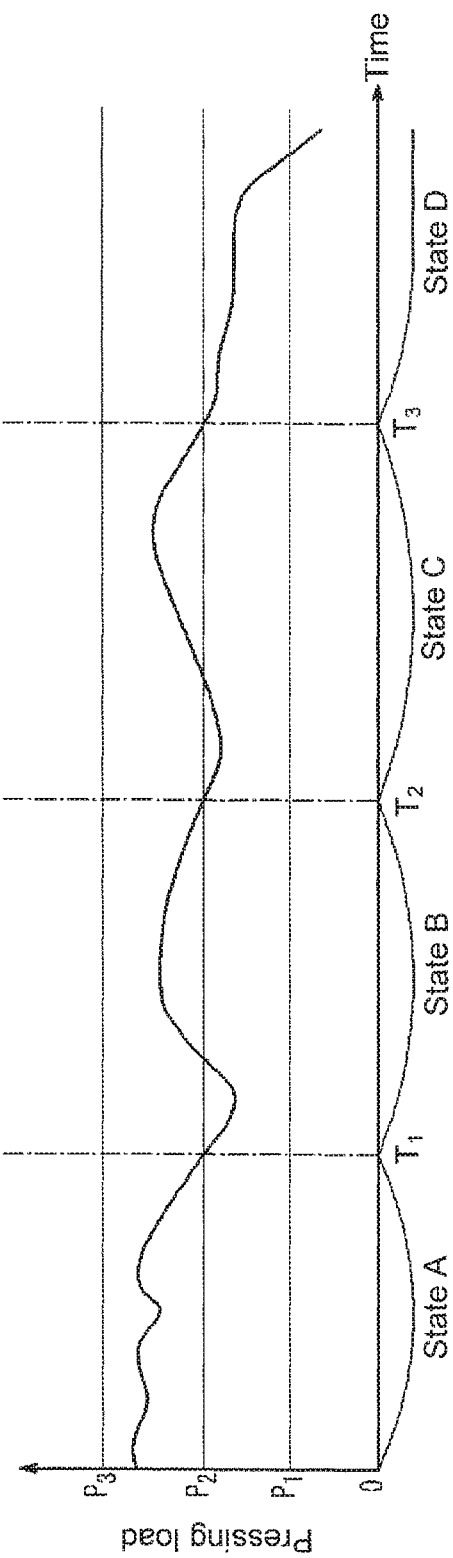
FIG. 12 is a diagram showing an exemplary operation process based on a process in which the closing operation of folders according to the fourth embodiment is repeated.

FIG. 12 is a diagram showing an exemplary operation process based on a process in which the closing operation of folders according to the fourth embodiment is repeated. In FIG. 12, the second load standard in the present operation is indicated as "load standard P2." In the present embodiment, a user is able to consecutively conduct closing operations of folders smoothly without releasing a finger from the input unit 34 of the touch panel 30 by a pressing force that is stronger than that of the opening process of folders described in the third embodiment. In this manner, the user can consecutively conduct operations to return to a folder in the level immediately above by closing the folder of the lowest hierarchy.

In this embodiment, since the load standard for closing a folder is set higher than the load standard for opening a folder, it is expected to further reduce the risk of errors by a user in comparison to the above-mentioned third embodiment in terms of unintentionally closing a folder. Furthermore, by setting the load standard for closing a folder higher than the load standard for opening a folder, even if the user releases a finger from the input unit 34 of the touch panel 30 after opening the folder, the folder does not close. If the user wishes to close a folder after releasing their finger from the input unit 34 of the touch panel 30, the user may simply apply a pressing load exceeding the second load standard that is higher than the first load standard for opening a folder at a location where there is no object of folders.

Fifth Embodiment

Next, a closing process of folders according to the fifth embodiment of the present disclosure is described.

In the fifth embodiment, the closing process is the process of an operation to simultaneously close all the folders opened and displayed on the display unit 32 of the touch panel 30 in each of the above-described embodiments. Therefore, descriptions that are the same as each of the above-described embodiments are omitted.

In the present embodiment, a first load standard and a second load standard are set as standards for conducting the closing operations of folders at once. The first load standard in the present embodiment is set based on a pressing load of a pressing input of which a pressing force is more powerful than normal operation inputs conducted by a user with respect to the display unit 32. For example, the first load standard can be set as a load standard that is higher than any of the load standards used in each of the above-mentioned embodiments.

The second load standard in the present embodiment is set as a load standard that is lower than the above-mentioned first load standards. For example, the second load standard can be set as a load standard that is lower than any of the load standards used in each of the above-mentioned embodiments. Specifically, the second load standard can be set as a very small load standard with a pressing load of close to zero, for example. In this case, the state where a pressing load detected by the load detection unit 40 is "not satisfying the second load standard" 40 of "a state of not satisfying the second load standard" is regarded as a case in which the pressing load detected by the load detection unit 40 is virtually zero.

Figure 13:
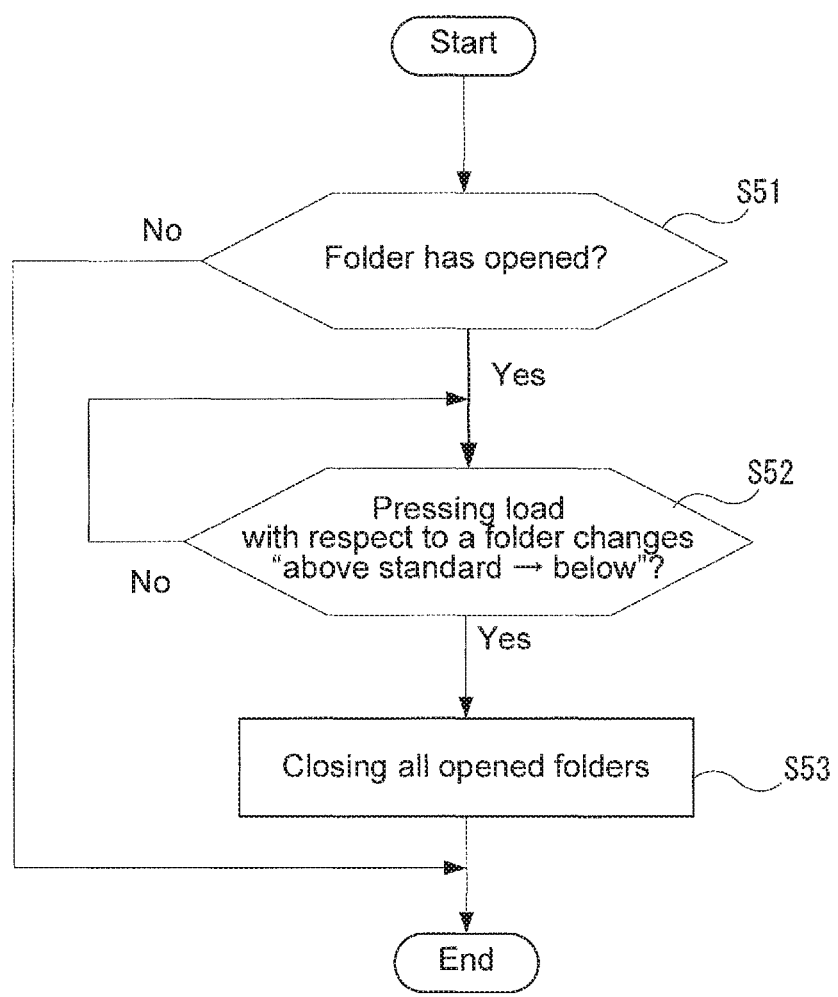
FIG. 13 is a flow diagram of a closing process of a folder according to the fifth embodiment.

FIG. 13 is a flow diagram of a closing process of a folder according to the fifth embodiment. The process starts at a time when the input unit 34 of the touch panel 30 detects a pressing input by a finger of a user and the like. Even at the starting point of the present process, it is presumed that the object of a folder is displayed on the display unit 32.

When the pressing input is detected at the input unit 34 of the touch panel 30, the control unit 20 first determines whether or not a folder that is open is displayed on the display unit 32 (Step S51). If the folder that is open is not displayed, the control unit 20 does not carry out the closing process of the folder according to the present embodiment and ends the process.

When the folder that was opened is displayed in Step S51, the control unit 20 determines whether or not the load detection unit 40 has detected the aforementioned pressing load that changes from a state of satisfying the first load standard to a state of not satisfying the second load standard (Step S52). If the load detection unit 40 detects a pressing load that changes from a state of satisfying the first load standard to a state of not satisfying the second load standard in Step S52, the control unit 20 closes all the folders that have been opened and are displayed on the display unit 32 (Step S53). That is, the control unit 20 brings all the icons of opened folders as well as files and/or folders in the lower or same hierarchies of the folders back to a state of not displaying on the display unit 32.

Figure 14:
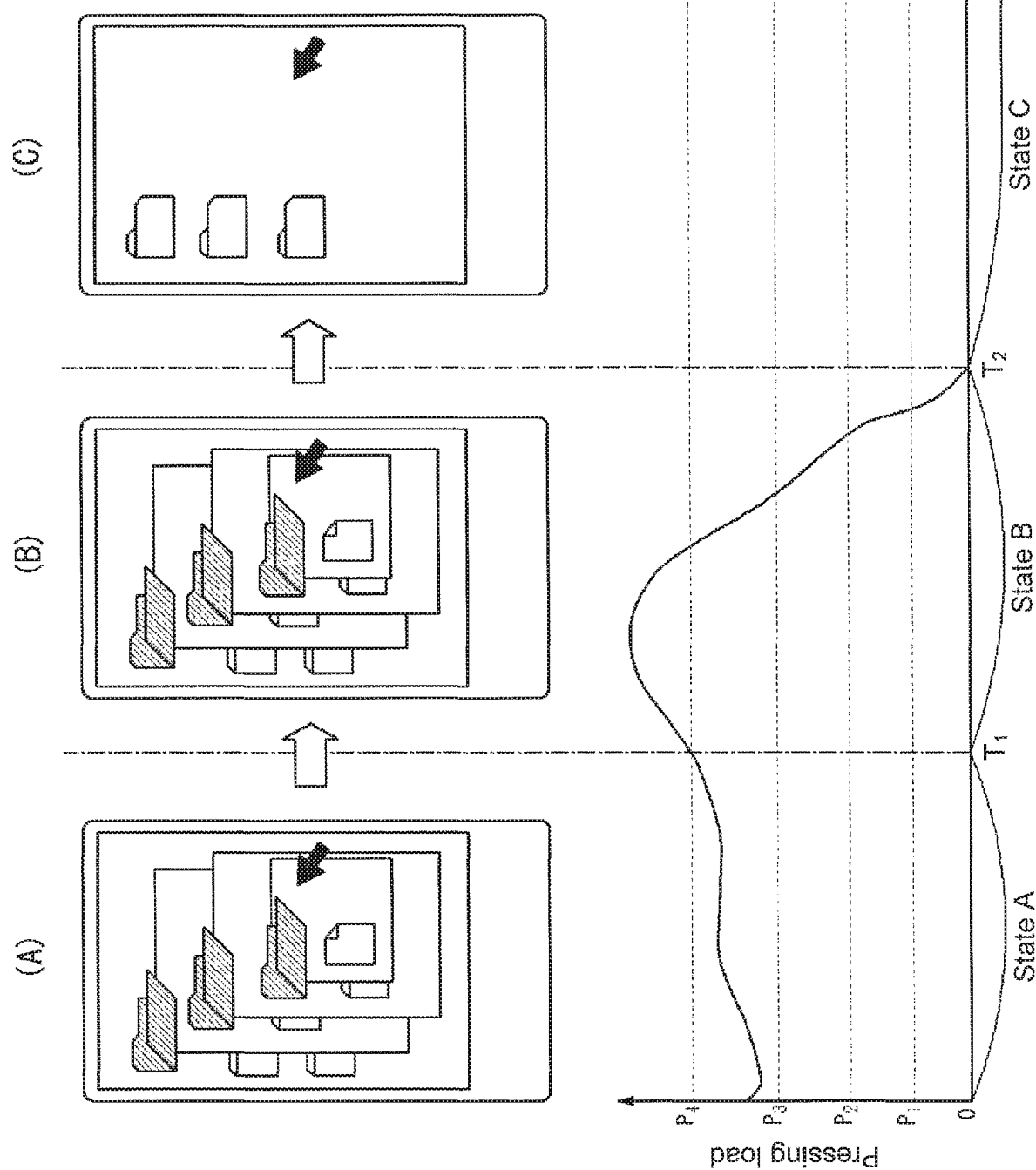
FIG. 14 is a diagram showing an exemplary operation process based on the process according to the fifth embodiment.
Figure 15:
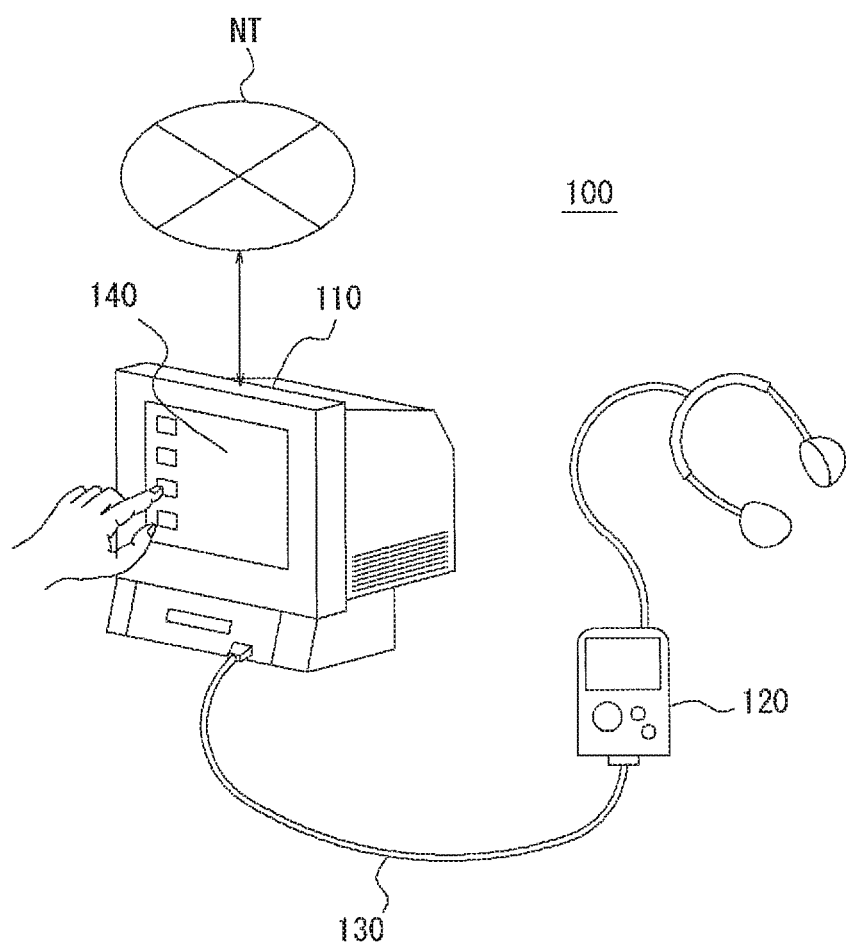
FIG. 15 is a diagram schematically showing a configuration of a data transfer system that includes an information processor by conventional technologies.

FIG. 14 is a diagram showing an exemplary operation process based on the process according to the aforementioned fifth embodiment. In FIG. 14, the first load standard described in the above process is indicated as "load standard P4." In addition, the second load standard is indicated as a load standard with a nearly zero pressing load, and "a state of not satisfying the second load standard" as a case in which the pressing load becomes virtually zero.

The state A shown in FIG. 14(A) indicates how the user increases the pressing force applied to the pressing input while their fingertip and the like is in contact with the input unit 34 of the touch panel 30. Three folders have been opened and are displayed on the display unit 32 of the touch panel 30 in FIG. 14(A).

The starting point of the state B (the time when the state A has been shifted to the state B) shown in FIG. 14(B) indicates a state in which the pressing load by the user pressing the input unit 34 of the touch panel 30 has satisfied a predefined load standard P4. At this time, there is no change on the display unit 32 of the touch panel 30 in FIG. 14(B), but if a pressing load satisfying the predefined load standard P4 is detected by the load detection unit 40, the control unit 20 may inform the user by displaying the situation on the display unit 32. For example, changing the color of all the folders the user is trying to close can be considered as a way of notification.

In the state B shown in FIG. 14(B), if the state changes to a state of not satisfying the second load standard (in a case in which the pressing load becomes virtually zero) (Step S52: Yes branch), the control unit 20 closes all the folders that have been opened as shown in FIG. 14(C) (Step S53).

In this manner, in the present embodiment, by very simple user operations that can be is simple and easily differentiated from other operations, it is possible to close all folders that have been opened at once. Hence, it is no longer necessary for the user to close each folder one by one. Therefore, according to the mobile phone 10 of the present embodiment, the user is able to conduct reliable folder operations simply and promptly using a touch panel.

The present disclosure is not limited to above-described embodiments. Many changes or modifications are possible. In the above embodiment, for example, the value of each load standard is presumed to be preliminarily set, but the user can preferably change or adjust the value when necessary. In this way, if the user feels uncomfortable with regard to the pressing load setting during an operation, the user can appropriately correct the settings afterward.

In each of the above-described embodiments, an exemplary process of informing a user by adding colors to objects was described in order to indicate to a user that an input related to an object such as a folder and the like is being detected or in order to show closing folders. However, if an input related to an object is detected, it is also possible to let the user recognize it by vibrating the vibration part 50 instead of adding a color to the object, or in addition to adding a color to the object. Furthermore, in such a case, for example, it is also possible to let the user recognize it by generating a specific sound from the voice-output unit 80 instead of by vibrations.

Moreover, in addition to what has been described in the above embodiments, for example, in Step S22 and in Step S24, it is also possible to indicate that a process with respect to the input from the user is conducted appropriately by vibrating the vibration part 50.

INDUSTRIAL APPLICABILITY

According to an input device of the present disclosure, if a pressing load to a touch-panel satisfies a predefined load standard and if it is detected while a folder is in an open state, the folder that has been opened is closed. Therefore, the input device of the present disclosure does not need to provide an icon for closing the folder when a folder is opened by operating a touch panel.

REFERENCE NUMERALS

10 mobile phone
20: control unit module
30: touch panel
32: display unit module
34: input unit module
40: load detection unit module
50: vibration part
60: storage part
70: voice-input unit module
80: voice-output unit module
90: key-input unit module

The invention claimed is:

1. An input device, comprising:
a display configured to display a first object;
a load detector configured to detect a pressing load applied to the input device; and
a controller, wherein
in response to a sequence of the pressing load satisfying a first predetermined load for a predetermined period of time and falling below the first predetermined load, and the sequence being repeated a number of times without the pressing load being released, the controller determines that a number of successive normal touch operations has been conducted and displays a series of objects, each being different from the first object, a number of the objects corresponding to the number of times of repetition of the sequence, such that only one object from among the series of objects is displayed in response to the pressing load satisfying the first predetermined load; and in response to the pressing load satisfying a second predetermined load, which is greater than the first predetermined load, for the predetermined period of time, the controller determines that a pressing touch operation, having more pressing force than the normal touch operation, has been conducted and displays a screen on which none of the series of objects is displayed.

2. The input device according to claim 1, wherein the period of time is a predetermined period of time for the load detector to determine that an input is received.

3. A method of controlling an input device, the method comprising;

displaying a first object;

detecting a pressing load applied to the input device;

in response to a sequence of the pressing load satisfying a first predetermined load for a predetermined period of time and falling below the first predetermined load, and the sequence being repeated a number of times without the pressing load being released, the controller determines that a number of successive normal touch operations has been conducted and displays a series of objects, each being different from the first object, a number of the objects corresponding to the number of times of repetition of the sequence, such that only one object from among the series of objects is displayed in response to the pressing load satisfying the first predetermined load; and in response to the pressing load satisfying a second predetermined load, which is greater than the first predetermined load, for the predetermined period of time, the controller determines that a pressing touch operation, having more pressing force than the normal touch operation, has been conducted and, upon the pressing load being released, displays a screen on which none of the series of objects is displayed.

4. The method of controlling an input device according to claim 3, wherein the period of time is a predetermined period of time for the load detector to determine that an input is received.

* * * * *